(12) United States Patent    (10) Patent No.:     US 9,983,932 B2
Shim et al.                  (45) Date of Patent:     May 29, 2018

(54) PIPELINE PROCESSOR AND AN EQUAL MODEL COMPENSATOR METHOD AND APPARATUS TO STORE THE PROCESSING RESULT

(75) Inventors: Heejun Shim, Seoul (KR); Yenjo Han, Seongnam-si (KR); Jae-Young Kim, Yongin-si (KR); Yeon-Gon Cho, Hwaseong-si (KR); Jinseok Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 1667 days.

(21) Appl. No.: 12/982,201

(22) Filed: Dec. 30, 2010

(65) Prior Publication Data

US 2011/0296143 A1    Dec. 1, 2011

(30) Foreign Application Priority Data

May 27, 2010    (KR) ......................... 10-2010-0049852

(51) Int. Cl.
*G06F 9/38*    (2018.01)
*G06F 11/14*   (2006.01)

(52) U.S. Cl.
CPC ........ *G06F 11/1407* (2013.01); *G06F 9/3857* (2013.01); *G06F 9/3861* (2013.01); *G06F 9/3867* (2013.01)

(58) Field of Classification Search
CPC .................................. G06F 9/327; G06F 9/268
See application file for complete search history.

(56) References Cited

U.S. PATENT DOCUMENTS

| 4,498,136 | A |   | 2/1985 | Sproul, III |
| 5,764,971 | A | * | 6/1998 | Shang et al. ................. 712/244 |
| 6,694,425 | B1 |  | 2/2004 | Eickemeyer |
| 6,708,267 | B1 |  | 3/2004 | Flacks et al. |
| 2002/0087840 | A1 | | 7/2002 | Kottapalli et al. |
| 2002/0116601 | A1 | | 8/2002 | Skrzeszewski et al. |
| 2002/0144093 | A1 | | 10/2002 | Inoue et al. |
| 2004/0111591 | A1 | | 6/2004 | Arimilli et al. |

(Continued)

FOREIGN PATENT DOCUMENTS

KR    10-1998-702203    7/1998
KR    10-2001-0077997   8/2001

(Continued)

OTHER PUBLICATIONS

Shen, John P., Lipasti, Mikko H. "Modern processor design: Fundamentals of superscalar processors" McGraw Hill, pp. 206-209, 2005.*

(Continued)

*Primary Examiner* — Jacob A Petranek
(74) *Attorney, Agent, or Firm* — F. Chau & Associates, LLC

(57) ABSTRACT

A pipeline processor which meets a latency restriction on an equal model is provided. The pipeline processor includes a pipeline processing unit to process an instruction at a plurality of stages and an equal model compensator to store the results of the processing of some or all of the instructions located in the pipeline processing unit and to write the results of the processing in a register file based on the latency of each instruction.

17 Claims, 13 Drawing Sheets

(56) References Cited

U.S. PATENT DOCUMENTS

| | | | |
|---|---|---|---|
| 2005/0081021 A1* | 4/2005 | Huang | G06F 9/30123 |
| | | | 712/228 |
| 2005/0108510 A1* | 5/2005 | Johnson | 712/228 |
| 2005/0216708 A1* | 9/2005 | Katayama | 712/228 |
| 2005/0262389 A1* | 11/2005 | Leijten | 714/6 |
| 2007/0074006 A1* | 3/2007 | Martinez et al. | 712/218 |
| 2007/0083742 A1* | 4/2007 | Abernathy | G06F 9/3836 |
| | | | 712/244 |
| 2007/0088935 A1 | 4/2007 | Feiste et al. | |
| 2007/0103474 A1 | 5/2007 | Huang et al. | |
| 2007/0106885 A1* | 5/2007 | Rychlik | 712/228 |
| 2007/0186085 A1 | 8/2007 | Yim et al. | |
| 2009/0119456 A1 | 5/2009 | Park et al. | |

FOREIGN PATENT DOCUMENTS

| | | |
|---|---|---|
| KR | 10-2001-0100879 | 11/2001 |
| KR | 10-2003-0088892 | 11/2003 |
| KR | 10-2004-0049254 | 6/2004 |
| KR | 10-2007-0080089 | 8/2007 |
| KR | 10-2009-0046609 A | 5/2009 |
| WO | WO 96/25705 | 8/1996 |

OTHER PUBLICATIONS

Korean Office Action dated Feb. 22, 2016 in counterpart Korean Application No. 10-2010-0049852 (10 pages in Korean with English translation).

* cited by examiner

FIG. 4

| Status | Restore signal | Backup signal | Action |
|---|---|---|---|
| #1 | 0 | 0 | Bypass |
| #2 | 0 | 1 | Backup |
| #3 | 1 | 0 | Restore |
| #4 | 1 | 1 | Backup & Restore |

PIPELINE PROCESSOR AND AN EQUAL MODEL COMPENSATOR METHOD AND APPARATUS TO STORE THE PROCESSING RESULT

CROSS-REFERENCE TO RELATED APPLICATION(S)

This application claims the benefit under 35 U.S.C. § 119(a) of Korean Patent Application No. 10-2010-0049852, filed on May 27, 2010, the entire disclosure of which is incorporated herein by reference for all purposes.

BACKGROUND

1. Field

The following description relates to an equal model conservation technique for a pipeline processor.

2. Description of the Related Art

An instruction is processed at several stages in a pipeline processor. For example, an instruction may be processed at a fetch stage, a decoding stage, an execution stage, and a write-back stage. In the pipeline processor, because a plurality of instructions sequentially pass through the individual stages of the pipeline while overlapping each during execution, programs can be processed at high speeds.

Examples of a pipeline processor include an equal model processor and a less-than-or-equal (LTE) processor. In the pipeline processor, a maximum latency may be set for each instruction. For example, a value of maximum latency for each instruction may depend on a processor type.

"Maximum latency" indicates a maximum time period for which an operation corresponding to each instruction is executed and the result of the execution is written in a target register. In the equal model processor, the result of the execution of an instruction is written in the target register after the set maximum latency elapses. Meanwhile, in the LTE model processor, the result of execution of an instruction may be written in the target register before set maximum latency elapses. Accordingly, the equal model processor allows flexible scheduling through multiple assignment of a target register because the result of the execution of an instruction is not written in the target register until maximum latency elapses. Alternatively, in the LTE model processor, because the result of execution of an instruction can be written in a target register before maximum latency elapses, multiple assignment of the target register is limited.

SUMMARY

In one general aspect, there is provided a pipeline processor comprising a pipeline processing unit to process an instruction according to a plurality of stages, and an equal model compensator to store the results of the processing of some or all of the instructions located in the pipeline processing unit and to write the processing results in a register file based on the latency of each instruction.

The equal model compensator may store the processing results in response to a backup signal for flushing the pipeline processing unit.

The equal model compensator may write the processing results in the register file in response to a restore signal for restarting the pipeline processing unit.

The equal model compensator may store data to be written in the register file upon the processing of the instruction, an address of a location at which the data is to be written, and write-enable information indicating whether or not the data is to be written in the register file.

The equal model compensator may write the stored processing results in the register file after latency of an instruction corresponding to the stored processing results elapses.

The plurality of stages may include a fetch stage, a decoding stage, a plurality of execution stages, and a write-back stage.

In response to a backup signal for flushing the pipeline processing unit, the pipeline processor may process instructions corresponding to remaining execution stages except for a first execution stage and may process instructions corresponding to a write-back stage.

The equal model compensator may store results obtained by processing the instructions corresponding to remaining execution stages except for the first execution stage and may store results obtained by processing the instructions corresponding to the write-back stage.

The equal model compensator may be disposed in front of and/or behind the write stage.

The equal model compensator may store the results of the processing in a FIFO fashion according to a clock or cycle of the pipeline processing unit.

In another aspect, there is provided an equal model conservation method comprising storing processing results that are a result of the processing of some or all of the instructions located in a pipeline, and writing the processing results in a register file in based on the latency of each instruction.

The equal model conservation method may further comprise, after storing the processing results, executing the instructions and another event.

The other event may include pipeline debugging or an interrupt service routine.

The processing results may include data to be written in a register file upon the processing of the instruction, an address of a location at which the data is to be written, and a write-enable indicating whether or not the data is to be written in the register file.

The storing of the processing results may comprise storing the processing results in a FIFO fashion according to a clock or cycle for processing the pipeline.

The writing of the processing results may comprise writing the stored processing results in the register file after latency of an instruction corresponding to the stored processing results elapses.

Other features and aspects may be apparent from the following description, the drawings, and the claims.

BRIEF DESCRIPTION OF THE DRAWINGS

FIG. 4 is a diagram illustrating an example of the status of an equal model compensator.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
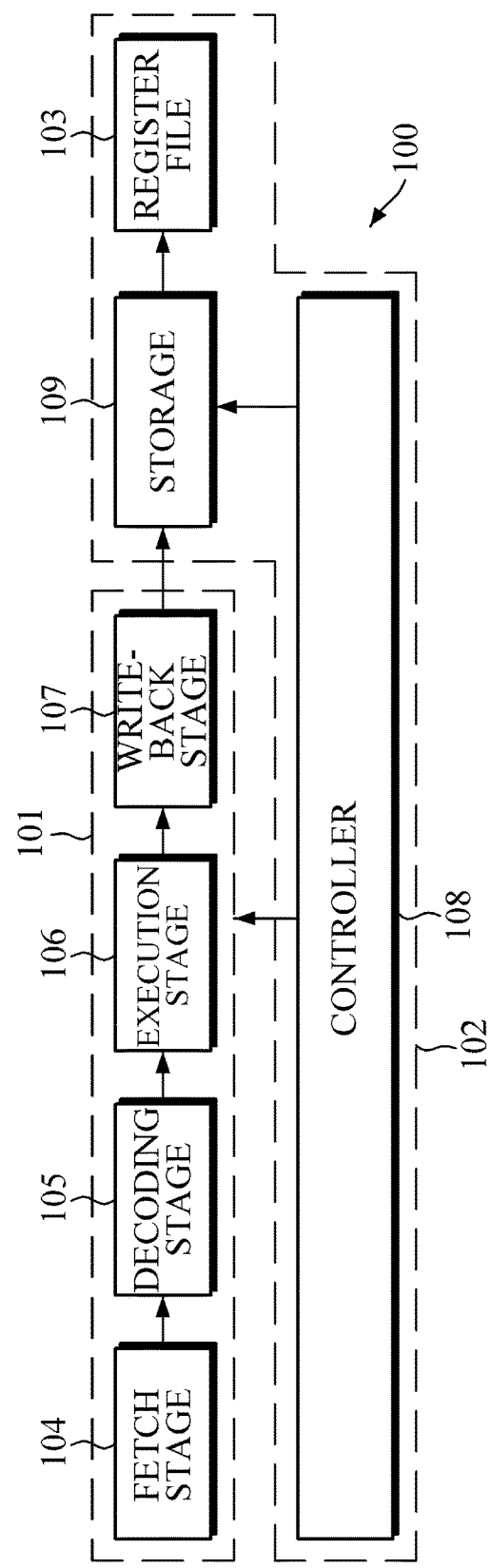
FIG. 1 is a diagram illustrating an example of a pipeline processor.

FIG. 1 illustrates an example of a pipeline processor.

Referring to FIG. 1, pipeline processor 100 may be used in an equal model processor in which the results of processing are reflected in a register file 103 after a predetermined latency elapses. When a pipeline is stopped and then restarted by a certain event, the pipeline processor 100 can meet a latency restriction on an equal model by arbitrarily storing the results of predetermined processing when the pipeline is stopped. In addition, when the pipeline is restarted, the pipeline may write the temporarily stored processing results in the register file 103 based on the latency of the corresponding instruction.

For example, when the pipeline processor 100 empties a pipeline processing unit 101 for the purposes of debugging, the pipeline processor 100 may store the processing results of some or all of the instructions existing in the pipeline processing unit 101 when an event related to debugging is generated. For example, the pipeline processor 100 may store the processing results in a storage 109 in a FIFO fashion. After the event is terminated, pipeline processor 100 may send the processing results stored in the storage 109 to the register file 103 based on the latency of each instruction.

In the example of FIG. 1, the pipeline processor 100 includes the pipeline processing unit 101 and an equal model compensator 102. In some embodiments, the pipeline processor 100 may further include the register file 103 in which the processing results of the pipeline processing unit 101 are written.

For example, the pipeline processing unit 101 may process instructions according to a plurality of stages based on a predetermined operation clock or clock cycle. For example, the stages may include a fetch stage 104, a decoding stage 105, an execution stage 106, and a write-back stage 107. It should be appreciated that the number of the stages may be changed according to their purposes of use and applications.

The fetch stage 104 corresponds to a construction or process for fetching instructions from an external memory. The decoding stage 105 corresponds to a construction or process for interpreting the fetched instructions and interpreting the content of the instructions. The execution stage 106 corresponds to a construction or process for obtaining operands based on the interpreted content of the instructions and executing the instructions. The write-back stage 107 corresponds to a construction or process for writing the results of the execution.

For example, the pipeline processing unit 101 may fetch an instruction in a first cycle, decode the instruction in a second cycle, execute the instruction in a third cycle, and write-back the result of the execution in a fourth cycle. In this example, the execution stage 106 occupies one cycle, however, it should be appreciated that the execution stage 106 may occupy a plurality of cycles.

The pipeline processing unit 101 may simultaneously process a plurality of instructions in parallel. For example, a first instruction may be fetched in a first cycle, and in a second cycle the first instruction may be decoded and simultaneously a second instruction may be fetched. In other words, as seen in a snapshot of the pipeline processing unit 101 at a certain moment, a first instruction may be located in the execution stage 106, a second instruction may be located in the decoding stage 105, a third instruction may be located in a fetch stage 104, and the like.

The equal model compensator 102 includes a controller 108 and a storage 109. In some embodiments, the equal mode compensator 102 may also include the register file 103. As another example, the register file 103 may be included in the pipeline processing unit 101. As another example, the register file 103 may be disposed externally from the equal mode compensator 102 and the pipeline processing unit 101. The controller 108 receives a certain event from an outside source and controls the pipeline processor 101 and the storage 109 according to the received event. The storage 109 temporarily stores the processing results of instructions processed by the pipeline processing unit 101 in a FIFO fashion.

For example, the controller 108 may control the pipeline processing unit 101 and storage 109 such that some or all of the instructions existing in the pipeline processing unit 101 are processed and the processing results are temporarily stored, in response to a backup signal for flushing the pipeline processing unit 101.

As another example, the controller 108 may control the pipeline processing unit 101 and storage 109 such that the temporarily stored results of the processing are transferred to the register file 103 and instructions are filled in the pipeline processing unit 101, in response to a restore signal for restarting the pipeline processing unit 101.

FIGS. 2A through 2G illustrate examples of an operation process of a pipeline processor. Hereinafter, a process in which a pipeline processing unit 101 is flushed and restarted is described with reference to FIGS. 2A through 2G. As an example, the pipeline processing unit 101 may be included in a pipeline processor 100 illustrated in FIG. 1.

Figure 2A:
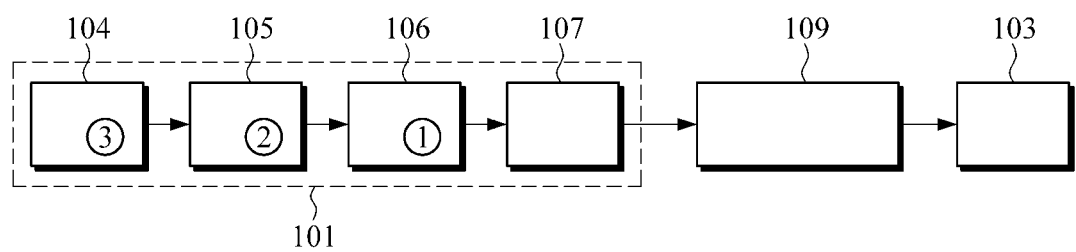
FIGS. 2A through 2G are diagrams illustrating examples of an operation process of a pipeline processor.

In the example illustrated in FIG. 2A, a backup signal for flushing the pipeline processing unit 101 is received based on a debugging or interrupt service routine (ISR) execution request. In this example, the backup signal is received at a time when a first instruction ① is located in the execution stage 106, a second instruction ② is located in the decoding stage 105, a third instruction ③ is located in the patch stage 104, and a write-back stage 107 is empty.

Figure 2B:
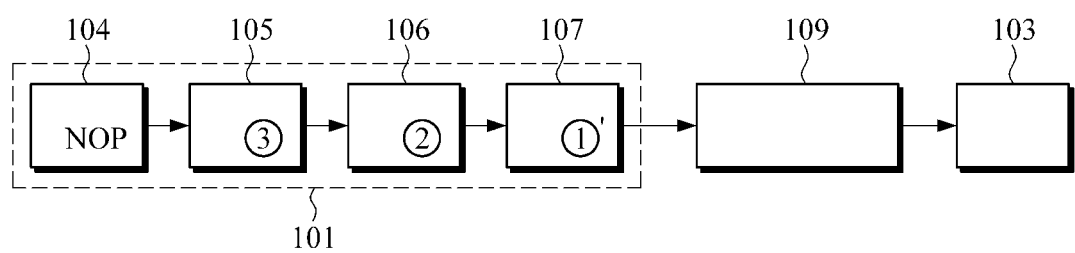

When the controller 108 sends the back-up signal to the pipeline processing unit 101 and storage 109, in a first cycle, the first instruction ① located in the execution stage 106 is executed to transfer the result of the execution ①' to the write-back stage 107, as illustrated I FIG. 2B. Also in the first cycle, the second instruction ② located in the decoding stage 105 is simultaneously transferred to the execution stage 106 and the third instruction ③ located in the fetch stage 104 is transferred to the decoding stage 105. In addition, a NOP, which is a no-operation instruction having no function, is filled in the fetch stage 104, as illustrated in FIG. 2B.

Figure 2C:
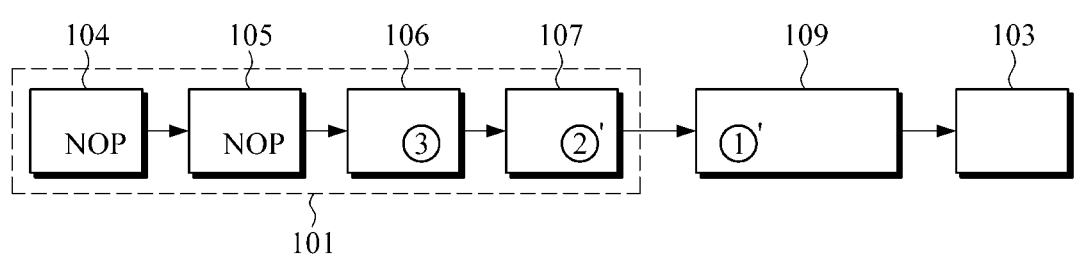

In a second cycle, the result of the execution ①' is transferred to the storage 109 and the storage 109 stores the result of the execution ①', as illustrated in FIG. 2C. Simultaneously, the second instruction ② located in the execution stage 106 of the pipeline processor 101 is executed to transfer the result of the execution ②' to the write-back stage 107. The third instruction ③ located in the decoding stage 105 is transferred to the execution stage 106. The NOP located in the fetch stage 104 is transferred to the decoding stage 105, and a NOP is again filled in the fetch stage 104, as illustrated in FIG. 2C.

Figure 2D:
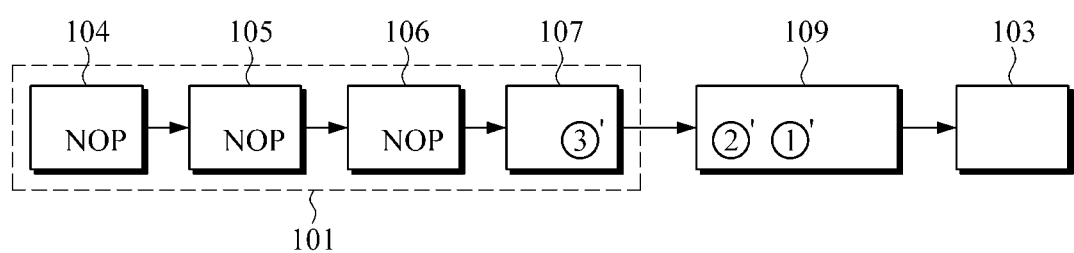

In a third cycle, the result of the execution ②' is stored in the storage 109, as illustrated in FIG. 2D. The third instruction ③ located in the execution stage 106 is simultaneously executed to transfer the result of the execution ③' to the write-back stage 107. Also, the NOP located in the decoding stage 105 is transferred to the execution stage 106 and the NOP located in the fetch stage 104 is transferred to the decoding stage 105. An NOP is again filled in the fetch stage 104, as illustrated in FIG. 2D.

Figure 2E:
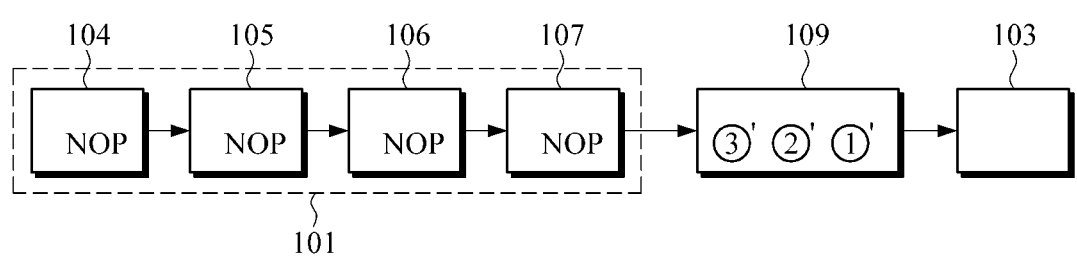

Likewise, in a fourth cycle, the result of the execution ③' is stored in the storage 109, NOP is filled in the remaining stages 104, 105, 106 and 107 and then the pipeline processing unit 101 is flushed, as illustrated in FIG. 2E.

When a certain event is generated to flush the pipeline processing unit 101, each instruction of the pipeline processing unit 101 is processed over stages according to an operation clock or clock cycle, and the processing results are sequentially stored in the equal model compensator 102.

In the examples of FIGS. 2A through 2E, each stage occupies one cycle, however, it is also possible for one or more of the stages to occupy a plurality of cycles. For example, the execution stage 106 may be composed of N cycles where N>1.

Also, in the current example, when an event for flushing the pipeline processing unit 101 is generated, all instructions existing in the pipeline processing unit 101 are processed and backed up, however, it is also possible for only some of the instructions that exist in the pipeline processing unit 101 to be processed and backed up. In this example, which instructions are processed may be determined based on the purposes and/or the use and applications. For example, it is possible that when the execution stage 106 is divided into a plurality of sub-execution stages, instructions after a first sub-execution stage may be flushed. For example, instructions corresponding to execution stages following the first sub-execution stage and instructions corresponding to a write-back stage may be flushed.

As illustrated in FIG. 2E, when the pipeline processing unit 101 is empty, various events, such as debugging or an interrupt service routine may be processed, and when the events are completely processed, the pipeline processing unit 101 may resume the processing of an instruction that was being processed before the events were generated.

Figure 2F:
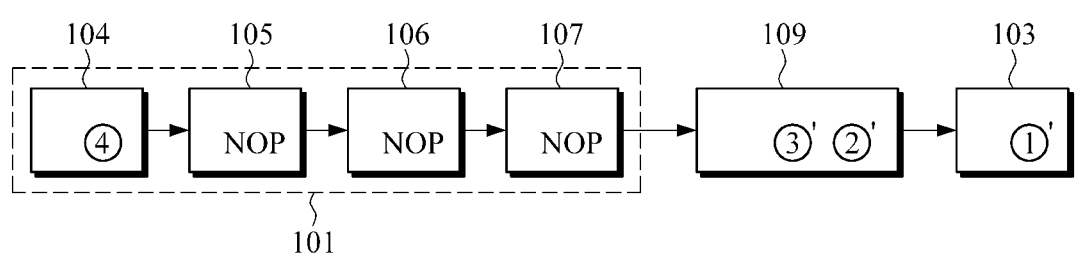

For example, as illustrated in FIG. 2F, a fourth instruction ④ is filled in the fetch stage 104 according to a restore signal, and the result of the execution ①' of the first instruction located in the storage 109 is transferred to the register file 103.

Figure 2G:
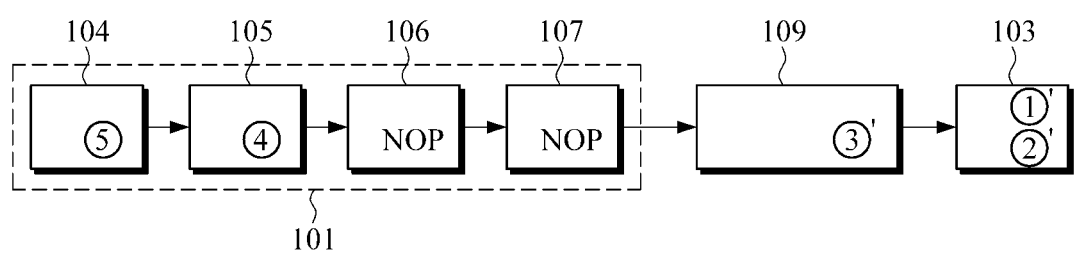

In the next cycle, as illustrated in FIG. 2G, a fifth instruction ⑤ is filled in the fetch stage 104, the fourth instruction ④ located in the fetch stage 104 is moved to the decoding stage 105, and the result of the execution ②' of the second instruction located in the storage 109 is transferred to the register file 103.

In the described examples, the result of the execution ①' of the first instruction and the result of the execution ②' of the second instruction are the resultant values obtained after the instructions ① and ② pass through each of the stages of the pipeline processing unit 101. The result of the execution ①' and the result of the execution ②' pass through the storage 109 in a FIFO fashion over several cycles and are written in the register file 103. Accordingly, the result of the execution ①' and the result of the execution ②' satisfy the latency of an equal model.

As another example, even when a trigger signal, such as an interrupt or breakpoint, is generated at an arbitrary time, it is possible to empty a pipeline with no delay, perform an instruction for debugging, and restart the pipeline processing unit 101.

Figure 3:
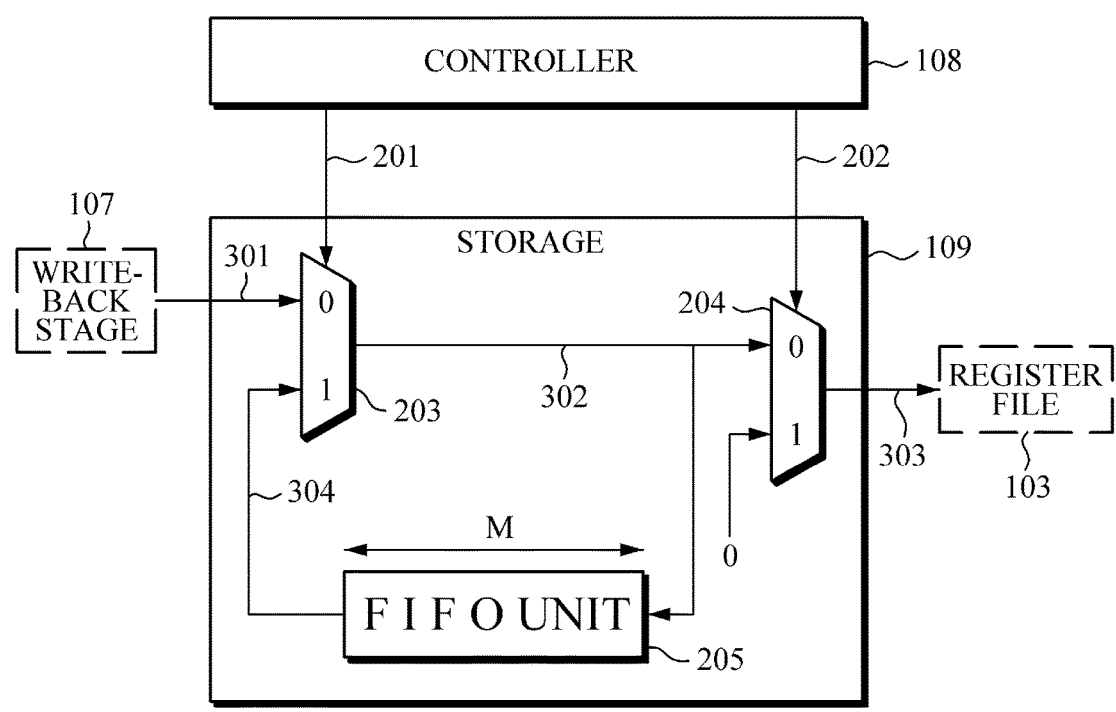
FIG. 3 is a diagram illustrating an example of an equal model compensator.

FIG. 3 illustrates an example of an equal model compensator.

Referring to FIG. 3, the equal model compensator includes a controller 108 and a storage 109.

The controller 108 applies a restore signal 201 and a back-up signal 202 to the storage 109. The restore signal 201 corresponds to a signal for restarting a pipeline processing unit and the back-up signal 202 corresponds to a signal for flushing the pipeline processing unit, for example, the pipeline processing unit 101 shown in FIG. 1.

In the example of FIG. 3, the storage 109 includes a first switch 203, a second switch 204, and a FIFO unit 205. The FIFO unit 205 may be used to store the execution results of instructions processed by the pipeline processing unit. In this example, the size of the FIFO unit 205 is M. M has a value that is equal to or greater than a maximum value of the number of clocks or cycles for which a certain instruction takes to pass through each of the stages. The first switch 203 selects one from between the output of a write-back stage 107 and the output of the FIFO unit 205, according to the restore signal 201. The second switch 204 selects one from between the output of the first switch 203 and a default value, according to the back-up signal 202. The output of the second switch 204 is transferred to a register file 103.

For example, the FIFO unit 205 may be connected to a register other than the register file 103 through an interface.

FIG. 4 illustrates an example of the status of an equal model compensator. Hereinafter, the operation of the equal model compensator is described with reference to FIGS. 3 and 4.

In status #1, in response to the restore signal 201 being "0," the first switch 203 may select the output 301 of the write-back stage 107. In response to the back-up signal 202 being "0", the second switch 204 may select the output 302 of the first switch 203. Accordingly, the output 301 of the write-back stage 107 may detour the FIFO unit 205 and may be transferred to the register file 103.

In status #2, in response to the restore signal 201 being "0," the first switch 203 may select the output 301 of the write-back stage 107. In response to the back-up signal 202 being "1," the second switch 204 may select a default value (for example, "0"). Accordingly, the output of the write-back stage 107 may be stored in the FIFO unit 205.

The output of the write-back stage 107 that is stored in the FIFO unit 205 may be referred to as EQ model data. For example, EQ model data may include data to be written in a register file according to execution of an instruction, an address of a location at which the data will be written, a write enable indicating whether or not the data can be written in the register file, and the like.

In status #3, in response to the restore signal 201 being "1," the first switch 203 may select the output 304 of the FIFO unit 205. In response to the back-up signal 202 being "0," the second switch 204 may select the output 302 of the first switch 203 which corresponds to the output 304 of the FIFO unit 205. Accordingly, a value stored in the FIFO unit 205 may be transferred to the register file 103.

In status #4, in response to the restore signal 201 being "1," the first switch 203 may select the output 304 of the FIFO unit 205. In response to the back-up signal 202 being "1," the second switch 204 may select a default value (for example, "0"). Accordingly, a value stored in the FIFO unit 205 may be backed up again.

Figure 5:
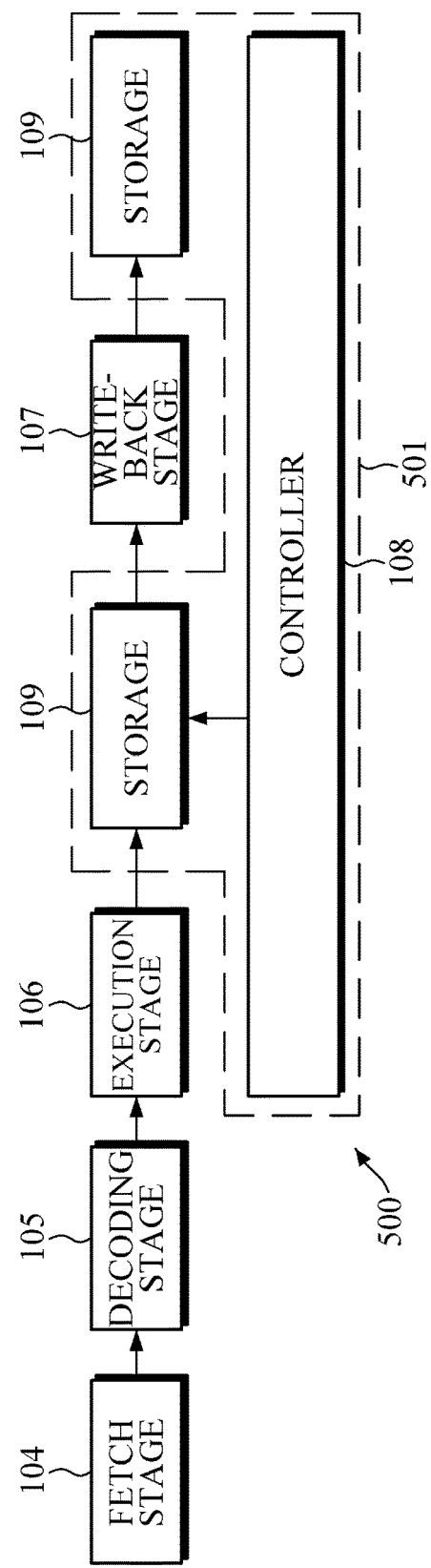
FIG. 5 is a diagram illustrating a second example of a pipeline processor.

FIG. 5 illustrates another example of a pipeline processor.

Referring to the example pipeline processor of FIG. 5, a storage 109 of an equal model compensator 501 of a pipeline processor 500 may be disposed behind one or more of the stages of the processor, for example, behind an execution stage 106 or behind a write-back stage 107. Accordingly, an equal model for the forwarded result of the execution stage 106 may be implemented.

Figure 6:
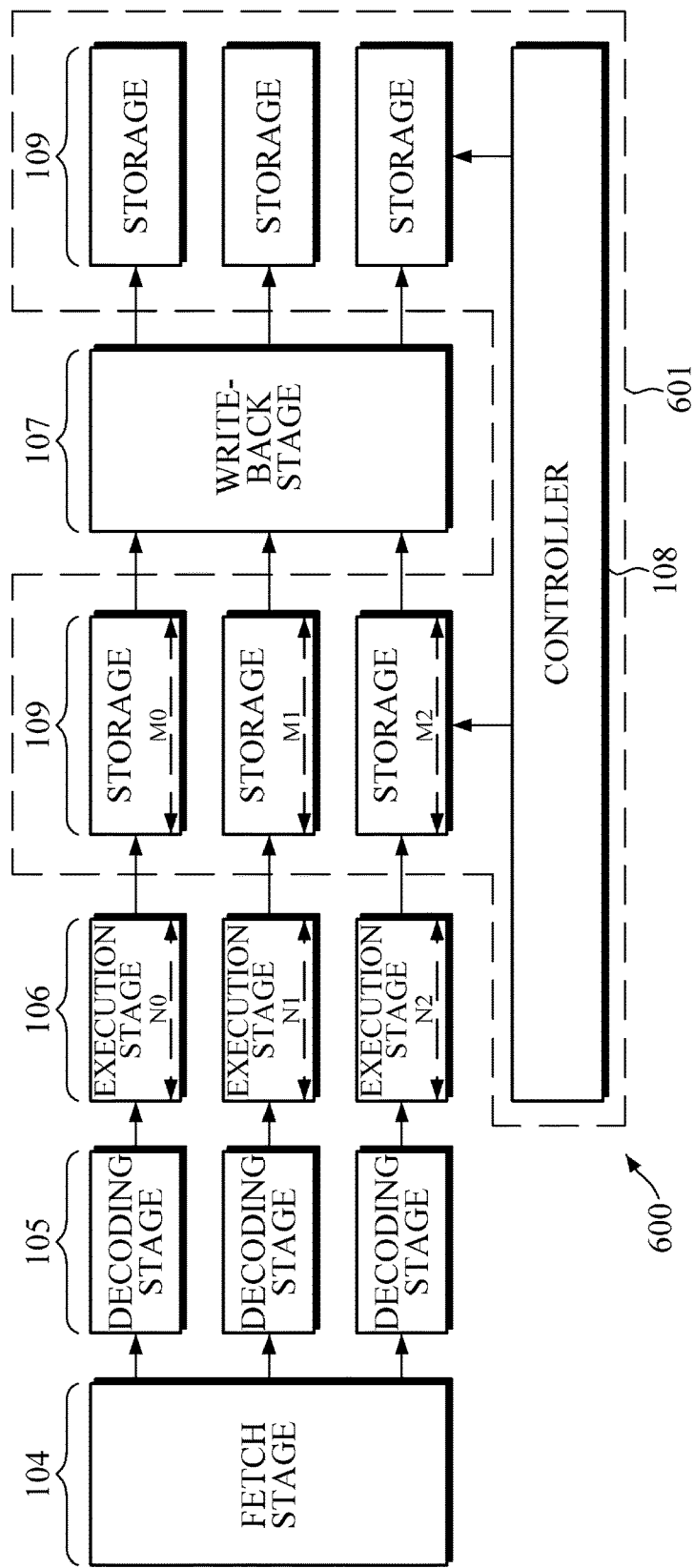
FIG. 6 is a diagram illustrating a third example of a pipeline processor.

FIG. 6 illustrates another example of a pipeline processor.

Referring to FIG. 6, pipeline processor 600 may be, for example, a very long instruction word (VLIW) processor having a plurality of pipelines. A storage 109 of an equal model compensator 601 may be provided for each pipeline path. For example, the size of the storage 109 may be based on the number of cycles included in the execution stage 106 for each pipeline path.

Figure 7:
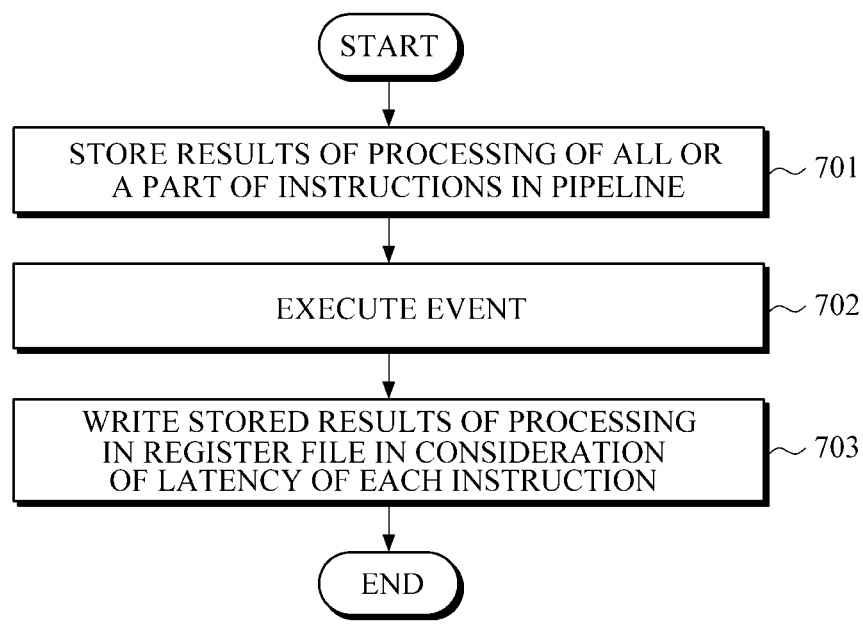
FIG. 7 is a flowchart illustrating an example of a method in which the pipeline processor conserves an equal model.

FIG. 7 illustrates an example of a method in which the pipeline processor conserves an equal model.

Referring to FIG. 7, in 701, the processing results of all or some of the instructions in a pipeline are stored according to a backup signal. For example, when a controller receives a debugging request, creates a backup signal, and applies the backup signal to a pipeline processing unit and a storage, the pipeline processing unit processes all or some of internal instructions (for example, instructions existing in a first execution stage and a write-back stage) and the storage stores the results of the processing in a FIFO fashion.

After the results of the processing are stored, in 702 the instructions located in the pipeline and other events are executed. For example, a code for debugging or an interrupt service routine code may be filled in the pipeline processing unit and executed.

After the debugging or the interrupt processing is completed, the results of the processing are written in a register file in consideration of latency of each instruction, in 703. For example, after debugging is complete, the controller creates a restore signal and applies the restore signal to the pipeline processing unit and the storage. Subsequently, the results of the processing stored in the FIFO fashion in the storage are one by one transferred to a register file.

Furthermore, a compiler of the processor may know the maximum latency for each instruction and may consider the maximum latency of each instruction during scheduling.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pipeline processor comprising:
   a pipeline processing unit to process an instruction according to a plurality of stages; and
   an equal model compensator to directly store the results of the processing of some or all of the instructions located in the pipeline processing unit and to write the processing results in a register file based on the latency of each instruction,
   wherein the equal model compensator comprises a FIFO unit,
   wherein the equal model compensator stores the processing results in the FIFO unit, in response to a backup signal for flushing the pipeline processing unit, and
   wherein the equal model compensator stores the processing results in the register file, in response to the backup signal for flushing the pipeline processing unit and a restore signal for restarting the pipeline processing unit being set to null.

2. The pipeline processor of claim 1, wherein the equal model compensator writes the processing results in the register file in response to a restore signal for restarting the pipeline processing unit.

3. The pipeline processor of claim 1, wherein the equal model compensator stores any one or any combination of data to be written in the register file upon the processing of the instruction, an address of a location at which the data is to be written, and write-enable information indicating whether or not the data is to be written in the register file.

4. The pipeline processor of claim 1, wherein the equal model compensator writes the stored processing results in the register file after latency of an instruction corresponding to the stored processing results elapses.

5. The pipeline processor of claim 1, wherein the plurality of stages comprises a fetch stage, a decoding stage, a plurality of execution stages, and a write-back stage.

6. The pipeline processor of claim 5, wherein, in response to a backup signal for flushing the pipeline processing unit, the pipeline processing unit processes instructions corresponding to the write-back stage.

7. The pipeline processor of claim 6, wherein the equal model compensator stores results obtained by processing the instructions corresponding to remaining execution stages except for the first execution stage and stores results obtained by processing the instructions corresponding to the write-back stage.

8. The pipeline processor of claim 5, wherein the equal model compensator is disposed in front of and/or behind the write-back stage.

9. The pipeline processor of claim 1, wherein the equal model compensator stores the results of the processing in a FIFO fashion according to a clock or cycle of the pipeline processing unit.

10. The pipeline processor of claim 1, wherein the equal model compensator comprises a storage having a size equal to at least the number of cycles it takes the instruction to pass through the plurality of stages.

11. The pipeline processor of claim 5, wherein the pipeline processing unit processes instructions corresponding to remaining execution stages except for a first execution stage, in response to a backup signal for flushing the pipeline processing unit.

12. An equal model conservation method comprising:
storing results of processing of some or all of the instructions located in stages of a pipeline; and
writing the processing results in a register file based on the latency of each instruction,
wherein the storing of the processing results comprises storing the processing results in an FIFO unit, in response to a backup signal for flushing the stages of the pipeline, and
wherein the storing of the processing results comprises storing the processing results in the register file, in response to the backup signal for flushing the stages of the pipeline and a restore signal for restarting the stages of the pipeline being set to null.

13. The equal model conservation method of claim 12, further comprising, after storing the processing results, executing the instructions and another event.

14. The equal model conservation method of claim 13, wherein the other event comprises pipeline debugging or an interrupt service routine.

15. The equal model conservation method of claim 12, wherein the processing results comprise any one or any combination of data to be written in a register file upon the processing of the instruction, an address of a location at which the data is to be written, and a write-enable indicating whether or not the data is to be written in the register file.

16. The equal model conservation method of claim 12, wherein the storing of the processing results comprises storing the processing results in a FIFO fashion according to a clock or cycle for processing the pipeline.

17. The equal model conservation method of claim 12, wherein the writing of the processing results comprises writing the stored processing results in the register file after latency of an instruction corresponding to the stored processing results elapses.

* * * * *